United States Patent [19]
Segatta et al.

[11] Patent Number: 5,396,940
[45] Date of Patent: Mar. 14, 1995

[54] SULFUR CURED RUBBER COMPOSITION CONTAINING EPOXIDIZED NATURAL RUBBER AND SILICA FILLER

[75] Inventors: Thomas J. Segatta, Lawton, Okla.; Paul H. Sandstrom, Tallmadge; John J. A. Verthe, Kent, both of Ohio

[73] Assignee: The Goodyear Tire & Rubber Company, Akron, Ohio

[21] Appl. No.: 122,082

[22] Filed: Sep. 17, 1993

[51] Int. Cl.$^6$ .................. C08L 9/00; C08L 15/00; C08K 3/36; C08K 5/36
[52] U.S. Cl. .................. 152/209 R; 523/437; 523/438; 525/101; 525/333.1
[58] Field of Search ............... 523/437, 430; 525/101, 525/333.1; 152/209 R

[56] References Cited

U.S. PATENT DOCUMENTS

| | | | |
|---|---|---|---|
| 3,768,537 | 10/1973 | Hess | 152/209 R |
| 3,873,489 | 3/1975 | Thurn | 152/209 R |
| 3,881,536 | 5/1975 | Doran, Jr. | 152/209 R |
| 3,884,285 | 5/1975 | Russell | 152/209 R |
| 4,906,706 | 3/1990 | Hattori | 523/343 |
| 5,118,546 | 6/1992 | Burlett | 525/215 |
| 5,153,248 | 10/1992 | Muse et al. | 524/105 |
| 5,157,079 | 10/1992 | Duck et al. | 525/113 |

*Primary Examiner*—Melvyn I. Marquis
*Assistant Examiner*—D. R. Wilson
*Attorney, Agent, or Firm*—Bruce J. Hendricks

[57] ABSTRACT

The present invention relates to a sulfur cured rubber composition particularly suited for use in tire treads and carcass ply compounds. The sulfur cured rubber composition is composed of, based on 100 parts by weight of rubber, from about 5 to 95 parts by weight of epoxidized rubber; from about 5 to 85 parts of a silica filler; from about 0.5 to 8.5 parts by weight of a silica coupling agent; and 95 to 5 parts by weight of a rubber selected from the group consisting of medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber and mixtures thereof.

7 Claims, No Drawings

SULFUR CURED RUBBER COMPOSITION CONTAINING EPOXIDIZED NATURAL RUBBER AND SILICA FILLER

FIELD

This invention relates to a tire having a rubber component containing a rubber compound reinforced with silica. In one embodiment, the tread is comprised of a rubber compound containing an epoxidized natural rubber component, at least one other rubber and a quantitative amount of silica.

BACKGROUND OF THE INVENTION

Pneumatic rubber tires are conventionally prepared with a rubber tread which can be a blend of various rubbers which is typically reinforced with carbon black.

In one aspect, rubbers are evaluated, selected and blended for a purpose of achieving desired tire tread properties and particularly a balance of tire tread characteristic properties, mainly, rolling resistance, traction and wear.

For various applications utilizing rubber including applications such as tires and particularly tire treads, sulfur cured rubber is utilized which contains substantial amounts of reinforcing filler(s). Carbon black is commonly used for such purpose and normally provides or enhances good physical properties for the sulfur cured rubber. Particulate silica is also sometimes used for such purpose, particularly when the silica is used in conjunction with a coupling agent. In some cases, a combination of silica and carbon black is utilized for reinforcing fillers for various rubber products, including treads for tires.

It is important to appreciate that, conventionally, carbon black is considered to be a more effective reinforcing filler for rubber tire compositions than silica. However certain combinations of silica and coupling agents in the presence of carbon black have shown excellent reinforcement similar to carbon black alone.

Other U.S. patents relating to silicas and silica reinforced tire treads include U.S. Pat. Nos. 3,451,458; 3,664,403; 3,768,537; 3,884,285; 3,938,574; 4,482,663; 4,590,052; 5,089,554 and British 1,424,503.

SUMMARY OF THE INVENTION

The present invention relates to a sulfur cured rubber composition particularly suited for the tread of a pneumatic tire. The sulfur cured rubber composition is composed of, based on 100 parts by weight of rubber, 5 to 95 parts by weight of epoxidized rubber; 5 to 85 parts by weight of a silica filler; 0.5 to 8.5 parts of a silica coupling agent; and a rubber selected from the group consisting of medium vinyl polybutadiene, styrene-butadiene rubber, synthetic cis 1,4-polyisoprene, synthetic 3,4-polyisoprene, natural rubber, cis-polybutadiene, styrene-isoprene rubber, styrene-isoprene-butadiene rubber, acrylonitrile-butadiene rubber and mixtures thereof.

DETAILED DESCRIPTION OF THE INVENTION

In accordance with one embodiment of the present invention, there is disclosed a pneumatic tire having an outer circumferential tread wherein said tread is a sulfur cured composition composed of, based on 100 parts by weight of rubber (phr) (a) 5 to 95 parts by weight of a epoxidized natural rubber; (b) 5 to 85 parts by weight of a silica filler; (c) 0.5 to 8.5 parts by weight of a silica coupling agent; and (d) 95 to 5 parts by weight of a rubber selected from the group consisting of medium vinyl polybutadiene, styrene-butadiene rubber, synthetic cis 1,4-polyisoprene, synthetic 3,4-polyisoprene, natural rubber, cis-polybutadiene, styrene-isoprene rubber, styrene-isoprene-butadiene rubber, acrylonitrile-butadiene rubber and mixtures thereof.

In accordance with another embodiment of the present invention, there is disclosed a pneumatic tire having a carcass ply compound wherein said carcass ply compound is a sulfur cured composition composed of, based on 100 parts by weight of rubber (phr) (a) 5 to 95 parts by weight of a epoxidized natural rubber; (b) 5 to 85 parts by weight of a silica filler; (c) 0.5 to 8.5 parts by weight of a silica coupling agent; and (d) 95 to 5 parts by weight of a rubber selected from the group consisting of medium vinyl polybutadiene, styrene-butadiene rubber, synthetic cis 1,4-polyisoprene, synthetic 3,4-polyisoprene, natural rubber, cis-polybutadiene, styrene-isoprene rubber, styrene-isoprene-butadiene rubber, acrylonitrile-butadiene rubber and mixtures thereof.

As known to those skilled in the art, epoxidized natural rubber is a modified form of natural rubber in which some of the unsaturation is replaced by epoxidized groups. Epoxidized natural rubber which may be used in the present invention may have a level of epoxidized modification ranging from about 15 to 85 mole percent. Preferably, the epoxidized level will be in the range of from about 20 to 50 percent. A particularly preferred epoxidized level is 25 percent. As known to those skilled in the art, epoxidized natural rubber can be obtained by epoxidizing natural rubber latex. This material is commercially available from Malaysian rubber producers under the designation ENR 50 and ENR 25 in the form of dehydrated bales.

The second component of the sulfur cured rubber compositions of the present invention is a siliceous pigment (alternatively referred to herein as silica filler). The silica filler that can be used include both pyrogenic and precipitated finely-divided silicas of the type heretofore employed for rubber compounding. The silica filler, however, is preferably of the type obtained by precipitation from a soluble silicate, such as sodium silicate. For example, silica fillers produced according to the method described in U.S. Pat. No. 2,940,830 can be used. These precipitated, hydrated silica pigments have a $SiO_2$ content of at least 50% and usually greater than 80% by weight on anhydrous basis. The silica filler may have an ultimate particle size in the range of from about 50 to 10,000 angstroms, preferably between 50 and 400 and, more preferably, between 100 and 300 angstroms. The silica may be expected to have an average ultimate particle size in a range of about 0.01 to 0.05 microns as determined by electron microscope, although the silica particles may even be smaller in size. The BET surface area of the filler as measured using nitrogen gas is preferably in the range of 40 to 600 square meters per gram, usually 50 to 300 square meters per gram. The BET method of measuring surface area is described in the *Journal of the American Chemical Society*, Vol. 60, page 304 (1930). The silica also has a dibutyl (DBP) absorption value in a range of about 200 to about 400, with a range of from about 220 to 300 being preferred.

Various commercially available silicas may be considered for use in this invention such as, for example only and with limitation, silicas commercially available from PPG Industries under the Hi-Sil trademark such as, for example, those with designations 210, 243, etc.; silicas available from Rhone-Poulenc, with designations of Z1165MP and Z165GR and silicas available from Degussa AG with designations VN2 and VN3, etc. The Rhone-Poulenc Z1165MP silica is a preferred silica which is reportedly characterized by having a BET surface area of about 160–170 and by a DBP value of about 250–290 and by having a substantially spherical shape.

The amount of silica filler used as the reinforcing filler can vary widely. Generally speaking, the amount may range between about 5 and about 85 parts by weight of siliceous pigment per 100 parts by weight of total rubber are used. More typically, between about 10 and 50 parts by weight of siliceous pigment per 100 parts of rubber are used.

In addition to the epoxidized natural rubber and silica, a silica coupling agent is used. Such coupling agents, for example, may be premixed, or prereacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are generally composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself. Usually the rubber reactive component of the coupler is temperature sensitive and tends to combine with the rubber during the final and higher temperature sulfur vulcanization stage and, thus, subsequent to the rubber/silica/coupler mixing stage and, therefore, after the silane group of the coupler has combined with the silica. However, partly because of typical temperature sensitivity of the coupler, some degree of combination, or bonding, may occur between the rubber-reactive component of the coupler and the rubber during an initial rubber/silica/coupler mixing stages and, thus, prior to a subsequent vulcanization stage.

The rubber-reactive group component of the coupler may be, for example, one or more of groups such as mercapto, amino, vinyl, epoxy, and sulfur groups, preferably a sulfur or mercapto moiety and more preferably sulfur.

A representative coupling agent may be, for example, a bifunctional sulfur containing organosilane such as, for example, bis-(3-triethoxysilylpropyl)tetrasulfide, bis-(3-trimethoxysilylpropyl)tetrasulfide and bis(3-triethoxysilylpropyl)tetrasulfide grafted silica from DeGussa, A.G. The amount of silica coupling agent which may be used may range from about 0.5 to about 8.5 parts by weight per 100 parts by weight of total rubber used. Preferably, the amount of silica coupler ranges from about 1.0 to about 5.0 parts by weight per 100 parts by weight of rubber used.

The sulfur cured rubber composition also contains a natural or synthetic diene derived rubber. Representative of the rubbers include medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber and mixtures thereof. Preferably, the rubber is natural rubber, styrene-butadiene rubber or cis-polybutadiene. This rubber, other than the epoxidized natural rubber, may be used in amounts ranging from 95 to 5 parts by weight based on 100 parts by weight of total rubber. Preferably, this rubber is used in amounts ranging from about 85 to about 50 parts by weight based on 100 parts by weight of total rubber.

In addition to the four components mentioned above, the sulfur cured rubber composition may contain conventional additives including reinforcing agents, fillers, peptizing agents, pigments, stearic acid, accelerators, sulfur vulcanizing agents, antiozonants, antioxidants, processing oils, activators, initiators, plasticizers, waxes, prevulcanization inhibitors, extender oils and the like. Representative of reinforcing agents include carbon black, which is typically added in amounts ranging from about 5 to 100 parts by weight based on 100 parts by weight of total rubber (phr). Preferably, carbon black is used in amounts ranging from about 15 to 85 phr. Typical carbon blacks that are used include N110, N121, N220, N231, N234, N242, N293, N299, N326, N330, M332, N339, N343, N347, N351, N358, N375, N472, N539, N550, N660, N683, N754, and N765. Depending on the particular use of the compound, the appropriate carbon black may be selected. Representative of conventional accelerators are amines, guanidines, thioureas, thiols, thiurams, sulfenamides, dithiocarbamates and xanthates which are typically added in amounts of from about 0.2 to about 5 phr. Representative of sulfur vulcanizing agents include element sulfur (free sulfur) or sulfur donating vulcanizing agents, for example, an amine disulfide, polymeric polysulfide or sulfur olefin adducts. The amount of sulfur vulcanizing agent will vary depending on the type of rubber and particular type of sulfur vulcanizing agent but generally range from about 0.1 phr to about 5 phr with a range of from about 0.5 phr to about 2 phr being preferred. Representative of the antidegradants which may be in the rubber composition include monophenols, bisphenols, thiobisphenols, polyphenols, hydroquinone derivatives, phosphites, phosphate blends, thioesters, naphthylamines, diphenol amines as well as other diaryl amine derivatives, para-phenylene diamines, quinolines and blended amines. Antidegradants are generally used in an amount ranging from about 0.1 phr to about 10 phr with a range of from about 2 to 6 phr being preferred. Representative of a peptizing agent that may be used is pentachlorophenol which may be used in an amount ranging from about 0.1 phr to 0.4 phr with a range of from about 0.2 to 0.3 phr being preferred. Representative of processing oils which may be used in the rubber composition of the present invention include aliphatic-naphthenic aromatic resins, polyethylene glycol, petroleum oils, ester plasticizers, vulcanized vegetable oils, pine tar, phenolic resins, petroleum resins, polymeric esters and rosins. These processing oils may be used in a conventional amount ranging from about 0 to about 50 phr with a range of from about 5 to 35 phr being preferred. Representative of an initiator that may be used is stearic acid. Initiators are generally used in a conventional amount ranging from about 1 to 4 phr with a range of from about 2 to 3 phr being preferred.

Accelerators may be used in a conventional amount. In cases where only a primary accelerator is used, the amounts range from about 0.5 to 2.5 phr. In cases where combinations of two or more accelerators are used, the primary accelerator is generally used in amounts ranging from 0.5 to 2.0 phr and a secondary accelerator is used in amounts ranging from about 0.1 to 0.5 phr. Combinations of accelerators have been known to produce a synergistic effect. Suitable types of conventional accelerators are amines, disulfides, guanidines, thioureas, thiazoles, thiurams, sulfenamides, dithiocarbamates and xanthates. Preferably, the primary accelerator is a sulfenamide. If a secondary accelerator is used, it is preferably a guanidine, dithiocarbamate or thiuram compound.

Pneumatic tires are conventionally comprised of a generally toroidal shaped carcass with an outer circumferential tread adapted to the ground contacting space beads and sidewalls extending radially from and connecting said tread to said beads. The tread may be built, shaped, molded and cured by various methods which will be readily apparent to those skilled in the art.

The sulfur cured rubber composition of the present invention may be integral with and adhere to various tire carcass substrate rubber compositions. Typically, such a rubber composition is at least one of a butadiene/styrene copolymer rubber, cis 1,4-polyisoprene (natural or synthetic rubber) and cis 1,4-polybutadiene. Optionally, such a blend, particularly where the tread is in the region of the sidewall of the tire may contain one or more butyl rubber, halobutyl rubber such as chlorobutyl or bromobutyl rubber and ethylene/propylene/conjugated diene terpolymer rubber, polyisoprene and polybutadiene rubber.

The sulfur cured rubber composition may be used to form a tread rubber which can then be applied in the building of a green tire in which the uncured, shaped tread is built unto the carcass following which the green tire is shaped and cured. Alternatively, the tread can be applied to a cured tire carcass from which the previously tread has been buffed or abraded away and the tread cured thereon as a retread.

The practice of this invention is further illustrated by reference to the following examples which are intended to be representative rather than restrictive of the scope of the invention. Unless otherwise indicated, all parts and percentages are by weight.

Example

Rubber compositions containing the materials set out in Table I were prepared in a BR Banbury using three separate stages of addition. The silica and coupling agent was added separately during the second stage of Banbury mixing. Table II sets out the cure behavior and vulcanizate properties for two control compounds A and B and also compounds C–F which contain epoxidized natural rubber. The addition of coupling agents (compounds B, D and F) provides an increase in modulus and hardness as well as improvements in DIN abrasion (lower value better) and adhesion to tire cords. This effect is most pronounced in Compounds D and F which also contain the epoxidized natural rubber. Compound D shows particularly high adhesion to nylon, polyester and aramid cord whereas Compound F shows the best DIN abrasion value. It is obvious that the combination of epoxidized natural rubber with silica filler in the absence of coupling agent, Compounds C and E does not provide superior properties compared to the Control A. On the other hand, the combination of epoxidized natural rubber with silica and coupling agent provides cured properties superior to Control B.

TABLE I

|  | Weight Parts | Addition Stage |
|---|---|---|
| Cis-1,4-polyisoprene[1] | 70–100 | 1 |
| Epoxidized NR[2] | 0–30 | 1 |
| Carbon Black | 35 | 1 |
| Antioxidant | 2 | 1 |
| Processing Oil | 5 | 1 |
| Zinc Oxide | 5 | 1 |
| Stearic Acid | 2 | 1 |
| Silica[3] | 15 | 2 |
| Coupling Agent[4] | 0–3 | 2 |
| Sulfenamide Accelerator | 1 | 3 |
| Sulfur | 1.4 | 3 |

[1]NAT 2200 from The Goodyear Tire & Rubber Company
[2]ENR-25 (epoxidized NR, 25%) from Guthrie in Malaysia
[3]Hi-Sil 210 from PPG Industries
[4]Bis-3-(triethoxysilylpropyl)tetrasulfide (50% active) from DeGussa A.G.

TABLE II

|  | A | B | C | D | E | F |
|---|---|---|---|---|---|---|
| Cis-1,4-polyisoprene | 100 | 100 | 85 | 85 | 70 | 70 |
| Epoxidized natural rubber | 0 | 0 | 15 | 15 | 30 | 30 |
| Coupling Agent | 0 | 3 | 0 | 3 | 0 | 3 |
| Rheometer, 150° C. | | | | | | |
| Maximum Torque | 26.7 | 31.3 | 30.3 | 33.6 | 33.0 | 34.3 |
| Minimum Torque | 7.9 | 7.7 | 9.3 | 9.0 | 10.0 | 8.6 |
| Delta Torque | 18.8 | 23.6 | 21.0 | 24.6 | 23.0 | 25.7 |
| T90, minutes | 21.0 | 19.0 | 21.3 | 17.8 | 19.8 | 16.5 |
| T25, minutes | 15.8 | 13.3 | 16.3 | 12.8 | 15.3 | 12.3 |
| Stress-Strain | | | | | | |
| Tensile Strength, MPa | 15.1 | 19.4 | 14.1 | 17.0 | 13.7 | 16.0 |
| Elongation at Break, % | 656 | 624 | 618 | 599 | 548 | 568 |
| 100% Modulus, MPa | 1.00 | 1.57 | 1.49 | 1.96 | 1.82 | 2.19 |
| 300* Modulus, MPa | 4.30 | 7.42 | 5.52 | 7.44 | 6.98 | 8.13 |
| Hardness | | | | | | |
| Room Temperature | 47.9 | 55.1 | 55.8 | 60.2 | 58.1 | 62.3 |
| 100° C. | 42.1 | 50.3 | 48.6 | 53.2 | 50.4 | 53.9 |
| Rebound | | | | | | |
| Room Temperature, % | 44.2 | 47.6 | 37.2 | 37.9 | 36.3 | 35.0 |
| 100° C., % | 54.2 | 60.0 | 50.8 | 54.2 | 52.5 | 53.4 |
| Peel Adhesion | | | | | | |
| Newtons | 247 | 283 | 190 | 233 | 63 | 102 |
| DIN Abrasion | | | | | | |
| % Standard | 256 | 155 | 276 | 160 | 225 | 127 |
| Cord Adhesion, Newtons | | | | | | |
| Nylon | 70 | 90 | 85 | 140 | 110 | 150 |
| Polyester | 85 | 150 | 100 | 220 | 125 | 160 |
| Aramid | 75 | 125 | 85 | 140 | 110 | 130 |

What is claimed is:

1. A pneumatic tire having an outer circumferential tread wherein said tread comprises a sulfur-cured rubber composition composed of, based on 100 parts by weight of rubber (phr);
   (a) 15 to 30 parts by weight of epoxidized natural rubber having a level of epoxidized modification in the range of from about 15 to 85 mole percent;
   (b) 5 to 85 parts by weight of a silica filler having an ultimate particle size in a range of from about 50 to 1,000 angstroms;
   (c) 0.5 to 8.5 parts by weight of a silica coupling agent having a triethoxy or trimethoxy silylpropyl group; and
   (d) 70 to 85 parts by weight of cis-1,4-polyisoprene rubber.

2. The pneumatic tire of claim 1 wherein the epoxidized natural rubber has a level of epoxidized modification in the range of from about 20 to 30 mole percent.

3. The pneumatic tire of claim 1 wherein the silica is selected from the group consisting of pyrogenic and precipitated silicas.

4. The pneumatic tire of claim 1 wherein the silica is precipitated silica.

5. The pneumatic tire of claim 1 wherein the silica has a BET surface area in the range of from about 40 to 600.

6. The pneumatic tire of claim 1 wherein the silica coupling agent is a bifunctional sulfur containing organosilane.

7. The pneumatic tire of claim 1 wherein the coupling agent is selected from the group consisting of bis-(3-triethoxysilylpropyl)tetrasulfide, bis-(3-trimethoxysilylpropyl)tetrasulfide and bis(3-triethoxysilylpropyl)tetrasulfide grafted silica.

* * * * *